US011297133B1

(12) United States Patent
Larrew

(10) Patent No.: US 11,297,133 B1
(45) Date of Patent: *Apr. 5, 2022

(54) DEPLOYING A CONTENT DISTRIBUTION NETWORK USING RESOURCES FROM CLOUD SERVICE PROVIDERS

(71) Applicant: United Services Automobile Association (USAA), San Antonio, TX (US)

(72) Inventor: Jason Paul Larrew, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/126,959

(22) Filed: Dec. 18, 2020

Related U.S. Application Data

(63) Continuation of application No. 16/883,531, filed on May 26, 2020, now Pat. No. 10,897,496, which is a (Continued)

(51) Int. Cl.
*G06F 9/455* (2018.01)
*H04L 67/1014* (2022.01)
(Continued)

(52) U.S. Cl.
CPC ...... *H04L 67/1014* (2013.01); *G06F 9/45558* (2013.01); *H04L 65/4084* (2013.01);
(Continued)

(58) Field of Classification Search
CPC ............. H04L 61/1511; H04L 43/0817; H04L 43/0888; H04L 43/0852; H04L 61/2007;
(Continued)

(56) References Cited

U.S. PATENT DOCUMENTS 7,849,207 B2 * 12/2010 Kazmi ................... H04L 67/28
709/232
10,129,114 B1 * 11/2018 Kowalski ................ H04L 69/40
(Continued)

FOREIGN PATENT DOCUMENTS

| JP | 2011-28547 | | 2/2011 | |
|---|---|---|---|---|
| JP | 2011028547 | * | 2/2011 | ............. G06F 12/00 |

OTHER PUBLICATIONS

Wikipedia.com [online], "Content delivery network," [retrieved on Dec. 5, 2018], retrieved from: https://web.archive.org/web/20170904193236/https://en.wikipedia.org/wiki/Content_delivery_network, 8 pages.

*Primary Examiner* — Aftab N. Khan
(74) *Attorney, Agent, or Firm* — Fish & Richardson P.C.

(57) ABSTRACT

A first computer transmits a respective first command to each of a plurality of second computer systems. Each first command includes instructions to initiate one or more virtual machine instances on the respective second computer system. Each virtual machine instance is configured to retrieve data from a third computer system over a communications network, cache the retrieved data, and transmit the cached data to one or more client computers over the communications network in response to a request for the cached data by the one or more client computers. The first computer system also transmits configuration data to each of the second computer systems. The configuration data includes indications of one or more parameters associated with retrieving the data from the third computer system, caching the retrieved data, and/or transmitting the cached data to the one or more client computers.

20 Claims, 15 Drawing Sheets

Related U.S. Application Data continuation of application No. 16/162,886, filed on Oct. 17, 2018, now Pat. No. 10,686,876.

(60) Provisional application No. 62/580,269, filed on Nov. 1, 2017.

(51) Int. Cl.
*H04L 65/612* (2022.01)
*H04L 67/568* (2022.01)

(52) U.S. Cl.
CPC .. *H04L 67/2842* (2013.01); *G06F 2009/4557* (2013.01); *G06F 2009/45595* (2013.01)

(58) Field of Classification Search
CPC . H04L 65/80; H04L 67/1008; H04L 67/2842; H04L 67/1029; H04L 65/4084; H04N 21/00; H04N 21/20
See application file for complete search history.

(56) References Cited

U.S. PATENT DOCUMENTS

| | | | |
|---|---|---|---|
| 10,432,708 B2* | 10/2019 | Sherf | H04L 65/4084 |
| 2010/0223364 A1* | 9/2010 | Wei | H04L 61/1511 |
| | | | 709/220 |
| 2011/0022812 A1* | 1/2011 | van der Linden | H04L 67/1097 |
| | | | 711/163 |
| 2014/0280898 A1* | 9/2014 | Voit | H04W 4/02 |
| | | | 709/224 |
| 2017/0201571 A1* | 7/2017 | Sherf | H04L 61/2007 |
| 2019/0222619 A1* | 7/2019 | Shribman | H04N 21/4622 |

* cited by examiner

DEPLOYING A CONTENT DISTRIBUTION NETWORK USING RESOURCES FROM CLOUD SERVICE PROVIDERS

CROSS-REFERENCE TO RELATED APPLICATIONS

This application is a continuation application of and claims priority under 35 U.S.C. § 120 to U.S. application Ser. No. 16/883,531, filed on May 26, 2020, which in turn is a continuation application of and claims priority under 35 U.S.C. § 120 to U.S. application Ser. No. 16/162,886, filed on Oct. 17, 2018, now U.S. Pat. No. 10,686,876, which claims priority from U.S. Provisional Application Ser. No. 62/580,269, filed on Nov. 1, 2017, the entire contents of each of which are incorporated herein by reference.

TECHNICAL FIELD

This disclosure relates to content distribution networks.

BACKGROUND

Computers can transmit and receive information over a communications network (e.g., the Internet). As an example, a server computer can store content in an electronic format, and make the content available to one or more client computers on a communications network. To retrieve the content, a client computer transmits a request for the content to the server computer. In response, the server computer selects the requested content, and transmits it to the client computer.

In some cases, content can include one or more assets of a webpage. For instance, a server computer can store one or more data files used to represent a webpage (e.g., documents, images, audio, videos, etc.). A server computer can transmit these assets to a client computer in response to a request for the webpage. Upon receipt, the client computer can use the assets to render the webpage (e.g., using a web browser).

SUMMARY

Implementations of the present disclosure are generally directed to deploying and maintaining a content distribution network using resources obtained from one or more cloud service providers. Implementations of this system enable a content distribution network to be deployed, maintained, and operated in a more efficient manner, and enable data to be transmitted more quickly and/or efficiently over a communications network.

In an aspect, a method includes transmitting, from a first computer system to each of a plurality of second computer systems, a respective first command. Each first command includes instructions to initiate one or more virtual machine instances on the respective second computer system. Each virtual machine instance is configured to retrieve data from a third computer system over a communications network, cache the retrieved data, and transmit the cached data to one or more client computers over the communications network in response to a request for the cached data by the one or more client computers. The method also includes transmitting, from the first computer system to each of the plurality of second computer systems, configuration data. The configuration data can include indications of one or more parameters associated with retrieving the data from the third computer system, caching the retrieved data, and/or transmitting the cached data to the one or more client computers. The method also includes obtaining, at the first computer system, an indication to modify at least one of the one or more parameters, and responsive to obtaining the indication to modify at least one of the one or more parameters, modifying the configuration data and transmitting the modified configuration data from the first computer system to each of the plurality of second computer systems.

Implementations of this aspect can include one or more of the following features.

In some implementations, the one or more parameters can include an indication of a geographical region associated with retrieving the data from the third computer system, caching the retrieved data, and/or transmitting the cached data to the one or more client computers.

In some implementations, the one or more parameters can include an indication of available network routes on the communications network associated with retrieving the data from the third computer system and/or transmitting the cached data to the one or more client computers.

In some implementations, the one or more parameters can include an indication of a load balancing between two or more virtual machine instances with respect to retrieving the data from the third computer system, caching the retrieved data, and/or transmitting the cached data to the one or more client computers.

In some implementations, the method can further include receiving, at the first computer system, resource data describing an availability of computational resources available to each of the second computer systems, and generating the indication to modify at least one of the one or more parameters based on the resource data.

In some implementations, the method can further include receiving, at the first computer system, logistical data describing an operating cost associated with each of the second computer systems, and generating the indication to modify at least one of the one or more parameters based on the logistical data.

In some implementations, the method can further include transmitting, from the first computer system to at least one of the second computer systems, a respective second command. Each second command can include instructions to terminate a virtual machine instance on the respective second computer systems.

In some implementations, at least one of the second computer systems can be maintained by a first organization. At least one of the second computer system can be maintained by a second organization different than the first organization.

In some implementations, the first organization can be a first cloud computing service provider. The second organization can be a second cloud computing server provider different than the second cloud computing service provider.

In some implementations, the configuration data can be transmitted from the first computer system to a particular second computer system in response to a request for the configuration data from that second computer system.

In some implementations, the request for the configuration data can be transmitted periodically to the first computer system from the second computer system.

Other implementations are directed to systems, devices and non-transitory, computer-readable mediums.

The implementations described herein can provide various technical benefits. In some cases, the implementations described herein can enable a content distribution network to be deployed, maintained, and operated in a more efficient manner. For example, as virtual machine instances can be dynamically initiated and terminated (e.g., in response to demand), computation resources are used more efficiently. Further, in some cases, the implementations described herein can enable data to be transmitted more quickly and/or efficiently over a communications network. For example, as multiple virtual machine instances are used to dynamically retrieve data, cache data, and transmit data to others (e.g., to fulfill requests for the data) in a distributive manner, any single system is less likely to be overburdened by requests. Further, data can be cached at multiple different geographical locations, instead of at a single location. Accordingly, the data can be transmitted over shorter distances in response to requests. Further still, as the system caches data at multiple different graphical locations and using multiple different systems, the system provides a degree of redundancy, and is less susceptible to failure.

The details of one or more embodiments are set forth in the accompanying drawings and the description below. Other features, objects, and advantages of the invention will be apparent from the description and drawings, and from the claims.

DETAILED DESCRIPTION

Figure 1:
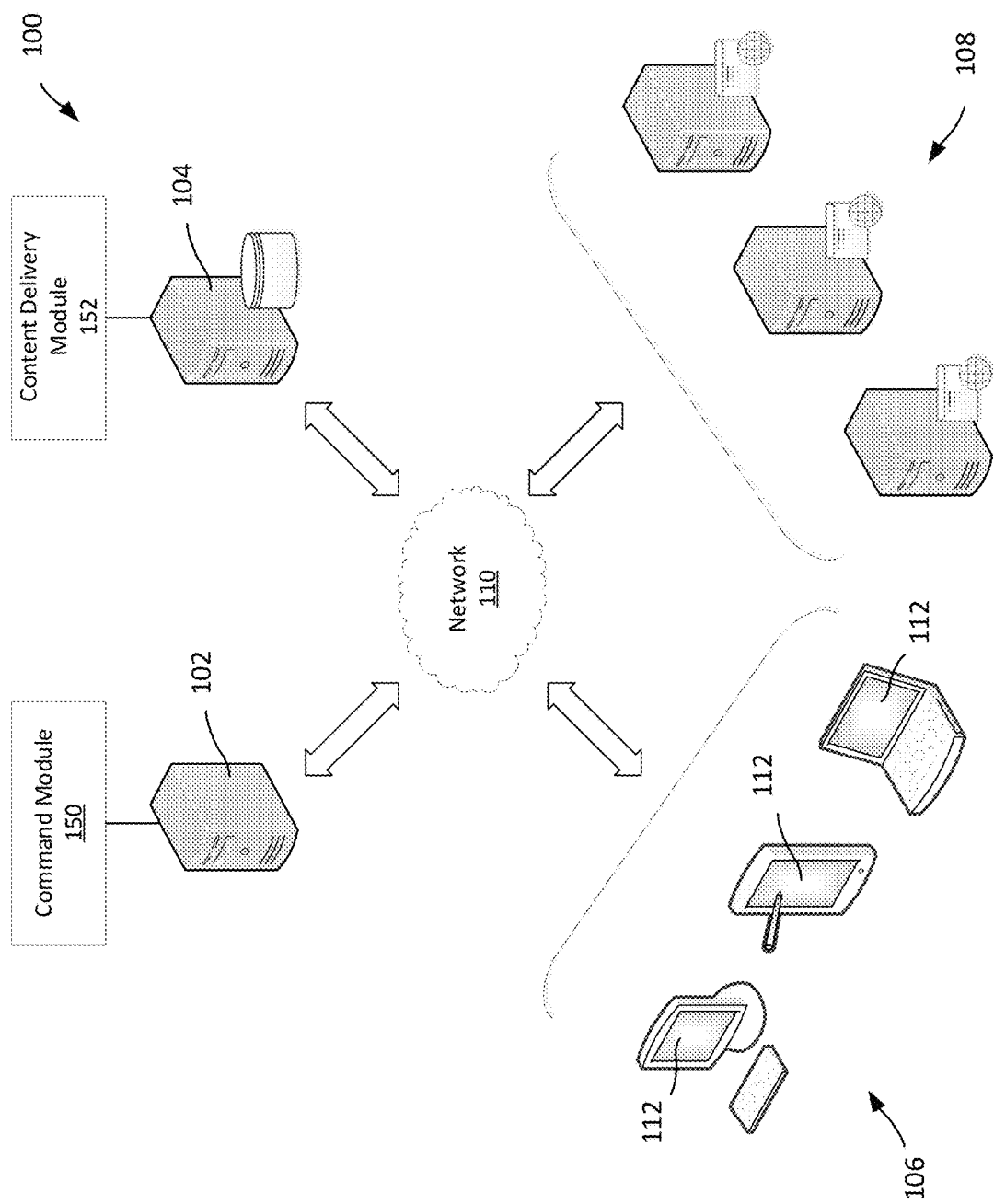
FIG. 1 is a schematic diagram of an example system for exchanging electronic information.

Implementations of the present disclosure are generally directed to deploying and maintaining a content distribution network using resources obtained from one or more cloud service providers. Implementations of this system enable a content distribution network to be deployed, maintained, and operated in a more efficient manner. Further, implementations of this system enable data to be transmitted more quickly and/or efficiently over a communications network.

In an example implementation, a content distribution network can be deployed through the use of one or more virtual machine instances operating on one or more server computers. Each virtual machine instance can perform operations to facilitate the efficient transfer to data across the communications network. For example, each virtual machine instance can retrieve and cache data from a common data source (e.g., a content server), and transmit the cached data to one or more client computers in response to a request for the cached data. Accordingly, the responsibilities of fulfilling requests are distributed across multiple different systems (e.g., rather than falling solely upon the content server).

In some cases, multiple virtual machine instances can work in conjunction to distribute data to client computers. For instance, in response to a client computer's request for data, a particular virtual machine instance can be selected to fulfill the request based on various factors. As examples, a particular virtual machine instance can be selected based on a geographic proximity between the virtual machine instance and the client computer, an operating cost associated with fulfilling the request using the virtual machine instance, an availability of network resources to fulfill the using the virtual machine instance, among other factors.

In some cases, some or all of the virtual machine instances can be maintained using resources obtained from one or more third-party cloud service providers. For instance, an organization seeking to deploy a content delivery network can access computer systems provided by a third-party cloud service provider, and initiate virtual machine instances on the computer systems in support of the content delivery network.

Further, operation of each of the virtual machine instances can be controlled in a centralized manner. For example, each virtual machine instance can be initiated by a centralized control module, and operate in accordance to a common set of configuration data (e.g., data specifying parameters for retrieving data from a content server, caching the retrieve data, and/or transmitting the cached data to client computers to fulfill requests). The configuration data can be maintained at a centralized location (e.g., a control computer system), and distributed to each of the virtual machine instances. Accordingly, each virtual machine instance can operate in accordance with the configuration data. Further, operation of the virtual machine instances can be altered by modifying the configuration data at the centralized location, and distributing the modified configuration data to each of the virtual machine instances.

Further, virtual machine instances can be dynamically initiated and/or terminated during operation of the content delivery network. For example, in response to an increased demand for data from a content server, additional virtual machine instances can be initiated (e.g., in response to a command from the centralized control module), such that additional resources are available to satisfy the demand. As another example, in response to a decreased demand for data from a content server, one or more virtual machine instances can be terminated (e.g., in response to a command from the centralized control module), such that fewer computation resources are consumed.

An example system 100 for exchanging electronic information is shown in FIG. 1. The system 100 includes a command module 150 maintained on a server computer system 102, a content delivery module 152 maintained on a server computer system 104, several client computer systems 106, and several additional server computer systems 108. The server computer system 104, the server computer system 104, the client computer systems 106, and the server computer systems 108 are communicatively coupled through a network 110.

Each client computer system 106 includes a respective user interface 112. Users can interact with the user interfaces 112 to retrieve and/or view data (e.g., data on the server system 102 and the command module 150, data on the server system 104 and the content delivery module 152, data on the client computer systems 106, and/or data on the server computer systems 108). Users can also interact with the user interfaces 112 to transmit data to other devices (e.g., to the server system 102 and the command module 150, to the server system 104 and the content delivery module 152, to the client computer systems 106, and/or to the server computer systems 108). Users can also interact with the user interfaces 112 to issue commands (e.g., to the server system 102 and the command module 150, to the server system 104 and the content delivery module 152, to the client computer systems 106, and/or to the server computer systems 108). In some implementations, a user can install a software application onto a client computer system 106 to facilitate performance of these tasks.

A client computer system 106 can be any electronic device that is used by a user to view, process, transmit and receive data. Examples of the client computer systems 106 include computers (such as desktop computers, notebook computers, server systems, etc.), mobile computing devices (such as cellular phones, smartphones, tablets, personal data assistants, notebook computers with networking capability), and other computing devices capable of transmitting and receiving data from the network 110. The client computer systems 106 can include devices that operate using one or more operating system (e.g., Microsoft Windows, Apple OSX, Linux, Unix, Android, Apple iOS, etc.) and/or architectures (e.g., x86, PowerPC, ARM, etc.) In some implementations, one or more of the client computer systems 106 can need not be located locally with respect to the rest of the system 100, and one or more of the client computer systems 106 can be located in one or more remote physical locations.

The network 110 can be any communications network through which data can be transferred and shared. For example, the network 110 can be a local area network (LAN) or a wide-area network (WAN), such as the Internet. The network 110 can be implemented using various networking interfaces, for instance wireless networking interfaces (such as Wi-Fi, Bluetooth, or infrared) or wired networking interfaces (such as Ethernet or serial connection). The network 110 also can include combinations of more than one network, and can be implemented using one or more networking interfaces.

The server computer systems 102, 104, and 106 are each illustrated as a respective single component. However, in practice, each can be implemented on one or more computing devices. A server computer system 102, 104, or 106 can be, for instance, a single computing device that is connected to the network 110, and the command module 150 and the content delivery module 152 can be maintained and operated on the single computing device. In some implementations, a server computer system 102, 104, or 106 can include multiple computing devices that are connected to the network 110, and the command module 150 and/or the content delivery module 152 can be maintained and operated on some or all of the computing devices. For instance, the server computer system 102 can include several computing devices, and the command module 150 can be distributive on one or more of these computing devices. In some implementations, a server computer system 102, 104, or 106 need not be located locally to the rest of the system 100, and portions of a server computer system 102, 104, or 106 can be located in one or more remote physical locations.

The content delivery module 152 is configured to store content data, and transmit copies of the content data in response to requests for the content data. For instance, in some cases, the content deliver module 152 can store one or more data files, and make the data files available to other devices of the system 100 via the communications network 110. As an example, a client computer system 112 can transmit a request for one or more of the data files to the server computer system 104 and the content delivery module 152. In response, the content delivery module 152 retrieves the requested data files, and transmits the retrieve data files to the client device 112 through the communications module 108. In some cases, the content delivery module 152 can be configured to store and transmit assets of a webpage (e.g., one or more data files used to represent a webpage, such as documents, images, audio, videos, etc.), such that other devices can render the webpage using the assets (e.g., through the use of a web browser).

Figure 2:
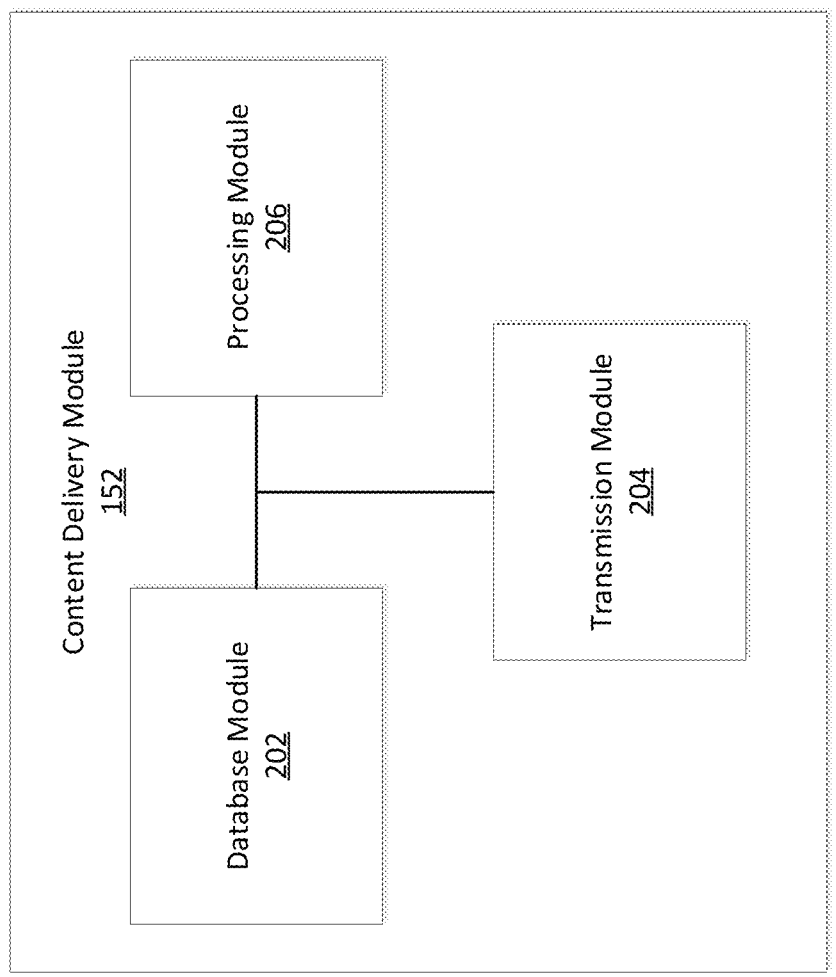
FIG. 2 is a schematic diagram of an example content delivery module.

FIG. 2 shows various aspects of the content delivery module 152. The content delivery module 152 includes several modules that perform particular functions related to the storage and transmission of data (e.g., content data). For example, the content delivery module 152 can include a database module 202, a transmission module 204, and a processing module 206.

The database module 202 is configured to store data (e.g., data available for retrieval by the other devices of the system 100). As example, the database module 202 can store data files, such as documents, images, audio, and/or videos. As another example, the database module 202 can store database files, program files (e.g., executable files, object code, libraries, and so forth), archive files, and/or computerized models. As another example, the database module 202 can store financial data (e.g., records of transactions between entities, financial institutions, and/or financial accounts). Although different examples of data are described above, these are merely illustrative. In practice, the database module 202 can store any data for retrieval by the other devices of the system 100.

The transmission module 204 enables data to be transmitted to and from the content deliver module 152. For example, the transmission module 204 can be communicatively connected to the network 110 such that it can transmit data to the server computer systems 102 and 106 and/or the client computer systems 112, and receive data from the server computer systems 102 and 106 and/or the client computer systems 112 via the network 110. As an example, information inputted by users on the client computer systems 112 (e.g., a request for data stored by the content delivery module 152) can be transmitted to the content delivery module 152 through the transmission module 204. This information can then be processed (e.g., using the processing module 206) and/or stored (e.g., using the database module 202). As another example, information from the content delivery module 152 (e.g., requested data stored on the database module 202) can be transmitted to one or more of the server computer systems 102 and 106 and/or the client computer systems 112 through transmission module 204.

The processing module 206 processes data stored or otherwise accessible to the content delivery module 152. For instance, the processing module 206 can receive a request for data (e.g., from a client computer system 112), locate and select the requested data (e.g., using the database module 202), and initiate transfer of the requested data to fulfill the request (e.g., using the transmission module 204).

The command module 150 is configured to deploy and maintain a content distribution network. In some cases, the content distribution network can be used to deliver data stored by the content delivery module 152 to one or more client computer systems 112. In some cases, the content distribution network can deliver data to clients in conjunction with the content delivery module 152. For example, at least some requests for data can be fulfilled by the content distribution network, while other requests for data can be fulfilled by the content delivery module 152. In some cases, the content distribution network can deliver data to clients in lieu of the content delivery module 152. For example, all of the requests for data can be fulfilled by the content distribution network instead of the content delivery module 152.

The command module 150 can deploy a content distribution network by initiating one or more virtual machine instances operating on one or more of the server computer systems 108. A virtual machine is an emulation of a computer system. Virtual machines are based on computer architectures and provide functionality mimicking that of a single physical computer. As an example, a "system" virtual machine can provide a substitute for a "real" machine (e.g., a discrete physical computing device), and can provide functionality needed to execute operating systems and/or applications using the operating systems. Further, a virtual machine can include a hypervisor, which uses native execution to share and manage hardware, allowing for multiple environments (e.g., multiple "instances" of a virtual machine) to operate on the same physical machine. In some cases, each virtual machine instance can be isolated from one another, such that they each emulate the functionality of a single discrete physical machine.

Each virtual machine instance can perform operations to facilitate the efficient transfer to data across the communications network. For example, each virtual machine instance can retrieve and cache data from the content delivery module 152, and transmit the cached data to one or more devices (e.g., the client computing devices 112) in response to a request for the cached data.

In some cases, the command module 150 can control the operation of the multiple virtual machine instances, such that the virtual machine instances can work in conjunction to distribute data to the client computing devices 112. For instance, in response to a client computing device's request for data, a particular virtual machine instance can be selected to fulfill the request based on various factors. As examples, a particular virtual machine instance can be selected based on a geographic proximity between the virtual machine instance and the client computer, an operating cost associated with fulfilling the request using the virtual machine instance, an availability of network resources to fulfill the using the virtual machine instance, among other factors.

Further, operation of each of the virtual machine instances can be controlled by the command module 150 in a centralized manner. For example, each virtual machine instance can operate in accordance to a common set of configuration data (e.g., data specifying parameters for retrieving data from a content server, caching the retrieve data, and/or transmitting the cached data to client computers to fulfill requests). The configuration data can be maintained on the command module 150), and distributed to each of the virtual machine instances. Accordingly, each virtual machine instance can operation in accordance with the configuration data. Further, operation of the virtual machine instances can be altered by modifying the configuration data at the command module 150, and distributing the modified configuration data to each of the virtual machine instances.

Further, virtual machine instances can be dynamically initiated and/or terminated during operation of the content delivery network. For example, in response to an increased demand for data from the content delivery module 152, the command module 150 can initiate additional virtual machine instances on one or more of the server computer systems 108, such that additional resources are available to satisfy the demand. As another example, in response to a decreased demand for data from the content delivery module 152, the command module 150 can terminate one or more virtual machine instances on one or more of the server computer systems 108, such that fewer computation resources are consumed.

In some cases, the command module 150 can be controlled, maintained, and/or operated by a first entity (e.g., a first individual or organization), and one or more of the server computer systems 108 can be controlled, maintained, and/or operated by a different entity (e.g., a second individual or organization). In some cases, one or more of the server computer systems 108 can be controlled, maintained, and/or operated by a cloud computing provider which offers access to the server computer systems 108 to others (e.g., for compensation). Example cloud computing providers include Amazon (e.g., the provider of Amazon Web Services and Elastic Cloud Compute), Google (e.g., the provider of Google App Engine), Hewitt Packard (e.g., the provider of Enterprise Services Cloud Compute and Cloud Application Delivery), and International Business Machines (e.g., the provider of SmartCloud Enterprise and SmartCloud Application Services), among others. Although the command module 150 and one or more of the server computer systems 108 can be controlled, maintained, and/or operated by different entities, the command module 150 can be used to coordinate the operations of each of the virtual machine instances on the server computer systems 108 to fulfill requests for data.

Figure 3:
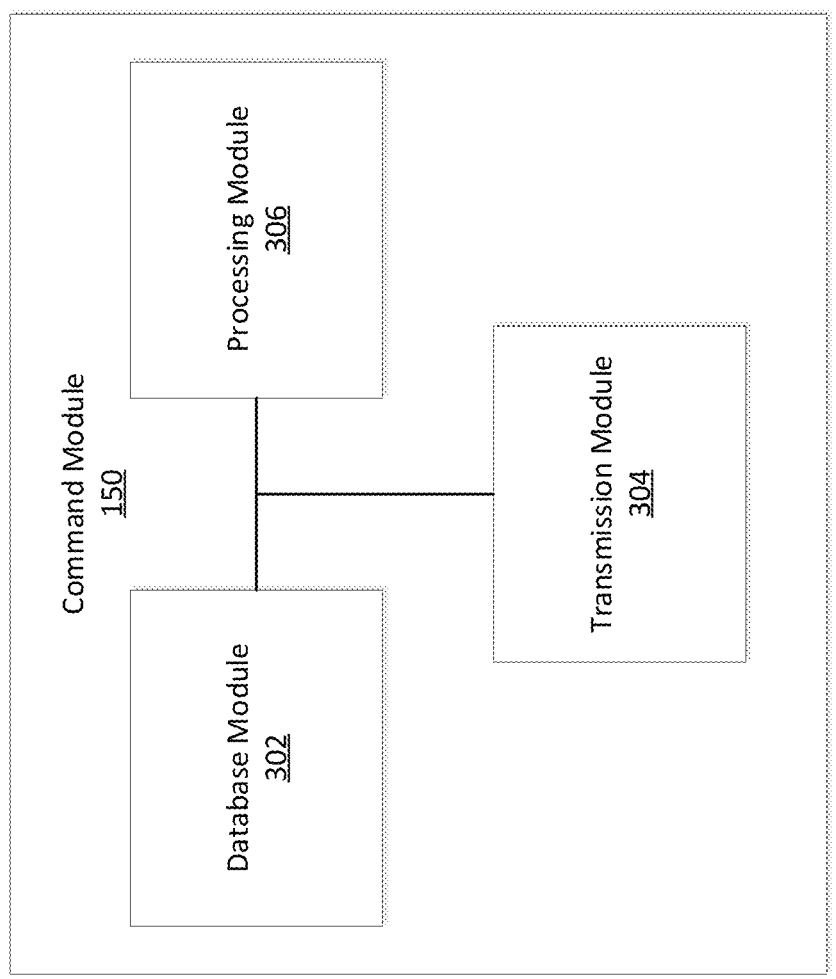
FIG. 3 is a schematic diagram of an example control module.

FIG. 3 shows various aspects of the command module 150. The command module 150 includes several modules that perform particular functions related to deploying and maintaining a content distribution network using the server computer systems 108. For example, the command module 150 can include a database module 302, a transmission module 304, and a processing module 306.

The database module 302 is configured to store data associated with deploying and maintaining a content distribution network. For example, the database module 302 can store initialization data specifying parameters for initializing virtual machine instances on the server computer systems 108. In some cases, initialization data can specify one or more resources to be allocated to each virtual machine instance. As an example initialization data can specify one or more particular devices to be allocated for executing a particular virtual machine instance, a number of physical and/or logical processors to be used to execute a particular virtual machine instance, an amount of memory to be allocated for execution of a particular virtual machine instance, an amount of network resources (e.g., bandwidth) to be allocated for used by a particular virtual machine instance, and so froth.

As another example, the database module 302 can store one or more disk images to provide data to the virtual machine instances. A disk image can be, for example, a computer file containing the contents and structure of a disk volume or a storage device (e.g., a hard disk drive, tape drive, floppy disk, optical disc, or USB flash drive). In some cases, a disk image can be made by creating a sector-by-sector copy of the source medium, thereby replicating the structure and contents of a storage device independent of the file system. In some cases, a disk image may span one or more files. In some cases, the disk image can include data enabling a virtual machine instance to execute one or more applications (e.g., one or more application that facilitate deployment and operation of a content delivery network. In some cases, a disk image can be "mounted" to a virtual machine instance, such that the contents of the imaged disk volume or storage device are made available to the virtual machine instance for use (e.g., emulating the functionality of a physical storage device).

As another example, the database module 302 can store configuration data for controlling the operation of each of the virtual machine instances. For example, the database module 302 can store a common set of configuration data, including data specifying parameters for retrieving data from a content server, caching the retrieve data, routing the cached data to one or more intermediate systems, and/or transmitting the cached data to client computers to fulfill requests. As another example, the database module 302 can store configuration data describing one or more security directives governing the retrieving, caching, routing, and/or transmitting of data. In some cases, the database module 320 can store multiple different sets of configuration data. For instance, the database module 302 can store different sets of configuration data for different groups of virtual machine instances. As another example, the database module 302 can store different sets of configuration data for use by the virtual machine instances under different circumstances or situations.

As another example, the database module 302 can store information regarding one or more of the server computer systems 108. For instance, the database module 302 can store an indication of a physical location of each of the server computer systems 108 (e.g., a geographical location) and/or an indication of a network location of each of the server computer systems 108 (e.g., a network address). The database module 302 can also store resource data regarding each server computer system 108. For example, resource data can include information regarding the network resources available to each of the server computer systems 108 and/or the virtual machine instances thereof (e.g., the availability of network pathways or routes to and from the server computer systems 108 and/or the virtual machine instances, the available network bandwidth for transmitting data through these pathways, and so forth). The database module 302 can also store information for accessing the server computer systems 108. For example, the database module 302 can store authentication credentials for accessing the server computer systems 108 (e.g., user names, passwords, etc.). The database module 302 can also store logistical data regarding each server computer system 108. For example, logistical data can include information regarding a cost associated with accessing and using each of the server computer systems 108 (e.g., the cost of initiating a virtual machine instance on a server computer system 108, the cost of transferring data to and/or from the server computer system 108, the cost of computational resources, such as CPU time, for running the virtual machine instance on the server computer system 108, and so forth).

In some case, some or all of the information described above can be stored in a central repository. For example, some or all of the information described above can be directly stored by the command module 150. As another example, some or all of the information described above can be stored in a central repository (e.g., Gitlab or Github), and retrieved by the command module 150 for use. This can be beneficial, for example, as it enables one or more users to control the deployment and operation of one or more virtual machine instances based on information stored in a common source. For example, one or more users can collaboratively review and modify information stored in the central repository to control the deployment and operation of a content delivery network.

The transmission module 304 enables data to be transmitted to and from the command module 150. For example, the transmission module 304 can be communicatively connected to the network 110 such that it can transmit data to the server computer systems 104 and 106 and/or the client computer systems 112, and receive data from the server computer systems 104 and 106 and/or the client computer systems 112 via the network 110. As an example, information inputted by users on the client computer systems 112 (e.g., commands from a user) can be transmitted to the command module 150 through the transmission module 304. This information can then be processed (e.g., using the processing module 306) and/or stored (e.g., using the database module 302).

Information from the command module 150 also can be transmitted to one or more of the server computer systems 104 and 106 and/or the client computer systems 112 through transmission module 304. As an example, the transmission module 304 can transmit commands to one or more of the server computer systems 108 (e.g., instructions to initiate and/or terminate one or more virtual machine instances on the server computer systems 108). As another example, the transmission module 304 can transmit initialization data, one or more disk images, and/or one or more sets of configuration data to the server computer systems 108 to control the operation of the virtual machine instances thereon.

The processing module 306 processes data stored or otherwise accessible to the command module 150. As an example, the processing module 306 can interpret and process information received by the transmission module 304. For instance, the processing module 306 can receive instructions from a user (e.g., from a client computer system 112), and translate the user's instructions into corresponding commands to one or more of the virtual machine instances to carry out the user's instructions. As another example, the processing module 306 can process modifications to data stored by the database module 302 (e.g., modifications to the initialization data, disk images, and/or sets of configuration data).

As another example, the processing module can determine a control scheme for fulfilling data requests using the virtual machine instances. For example, the processing module can generate one or more rules specifying which virtual machine instance or instances should be selected in response to particular requests for data from the client computer devices 112. These rules can depend on various factors. As an example, one or more rules can specify that a particular virtual machine instance can be selected to fulfill a request based on a geographic proximity between the virtual machine instance and the client computer making the request. As another example, one or more rules can specify that a particular virtual machine instance be selected to fulfill a request based on an operating cost associated with fulfilling the request using the virtual machine instance. An operating cost could include, for example, a cost of initiating the virtual machine instance, a cost of utilizing the virtual machine instance for a period of time to fulfill the request, and/or a cost of allotting network resources (e.g., network bandwidth) to fulfill the request, among others. As another example, one or more rules can specify that a particular virtual machine instance be selected to fulfill a request based on an availability of network resources to fulfill the using the virtual machine instance. As another example, one or more rules can specify that that a particular virtual machine instance be selected to fulfill a request based on a balancing of loads across multiple different virtual machine instances (e.g., spreading requests across multiple different virtual machine instances such that one virtual machine instance is not overburdened by requests).

In some cases, the processing module 302 can modify generate commands, initiate of transmission data to the server computers 108, and/or modify data on the database module 302 in accordance with these rules. For instance, the processing module 302 can generate commands to one or more of the server computer systems 108 (e.g., instructions to initiate and/or terminate one or more virtual machine instances on the server computer systems 108) in accordance with these rules. As another example, the processing module 302 can generate and/or modify the initialization data, one or more disk images, and/or one or more sets of configuration data on the database module 302 in accordance with these rules. As another example, the server computer systems 108 can initiate transmission of data to the server computer systems 108 (e.g., initialization data, disk images, and/or sets of configuration data) to control the operation of the virtual machine instances thereon in accordance with these rules. In some cases, the transmission of data can occur in real-time or substantially real-time. In some cases, the transmission of data can occur periodically (e.g., once every minute, once every hour, once every day, or according to some other time interval). In some cases, the transmission of data can occur in response to a request from a server computer system 108 (e.g., a request for updated data).

As described above, one or more implementations of the system 100 enable a content distribution network to be deployed, maintained, and operated in a more efficient manner. Further, implementations of the system 100 enable data to be transmitted more quickly and/or efficiently over a communications network. An example of this functionality is illustrated in FIGS. 4A-4E.

Figure 4A:
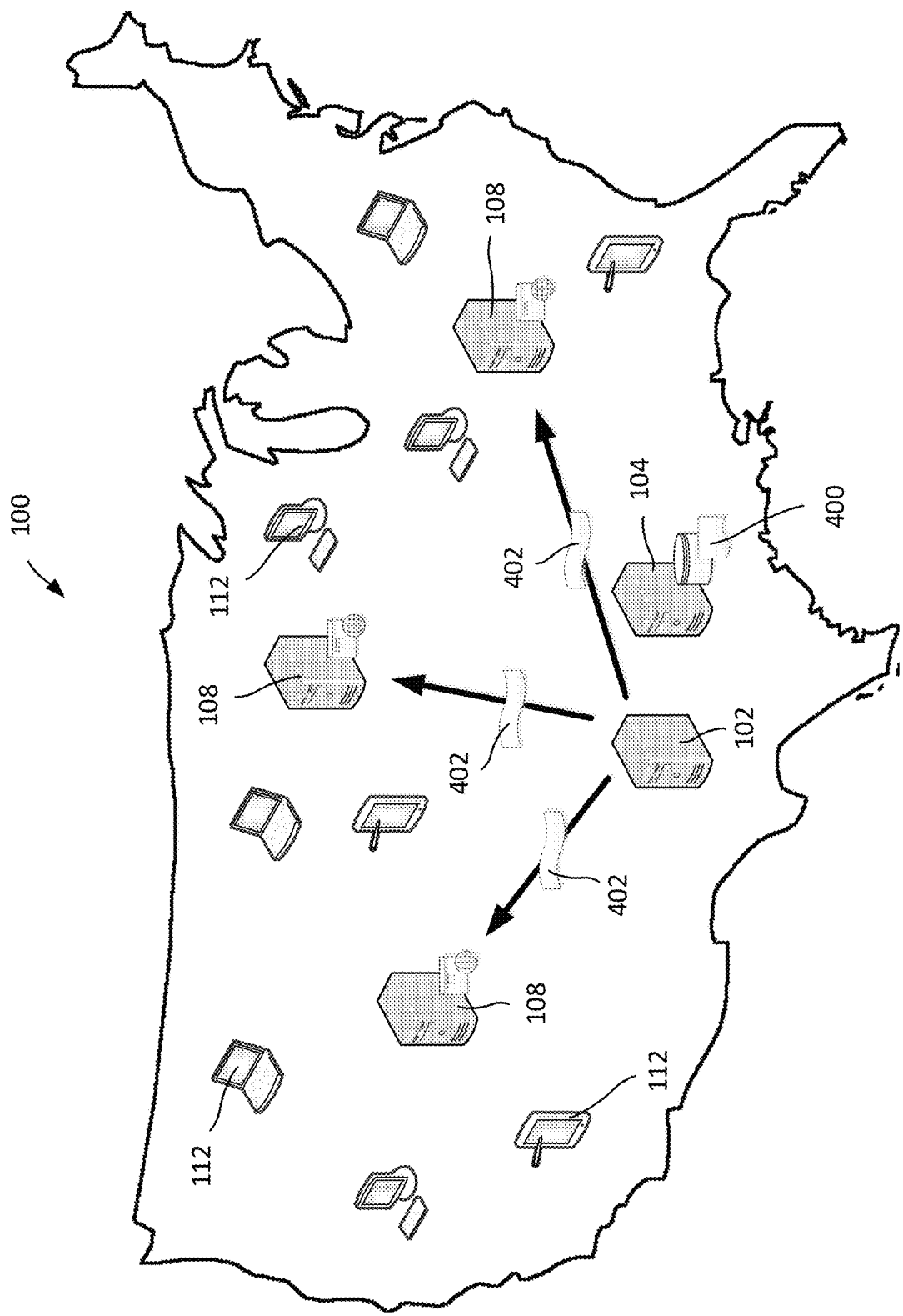
FIGS. 4A-4E are schematic diagrams depicting an example deployment and operation of a content delivery network.

As shown in FIG. 4A, the system 100 includes the server computer system 102 (maintaining the command module 150 shown in FIGS. 1 and 3), the server computer system 104 (maintaining the content delivery module 152 shown in FIGS. 1 and 2), several client computer systems 106, and several additional server computer systems 108. The server computer system 104, the server computer system 104, the client computer systems 106, and the server computer systems 108 are communicatively coupled through a network 110 (e.g., as shown in FIG. 1). Some or all of the components of system 100 can be remote from each other. For example, as shown in FIG. 4A, the server computer system 104, the server computer system 104, the client computer systems 106, and the server computer systems 108 each can be located at a different geographical location.

In this example, the server computer system 104 (though the content delivery module 152) is storing data 400, and has made the data 400 available to the other devices of system 100 for retrieval. For example, a client computer system 112 can transmit a request for the data 400 to the server computer system 104, and in response, the server computer system 104 can transmit the data 400 to the client computer system 112 to fulfill the request.

Figure 4B:
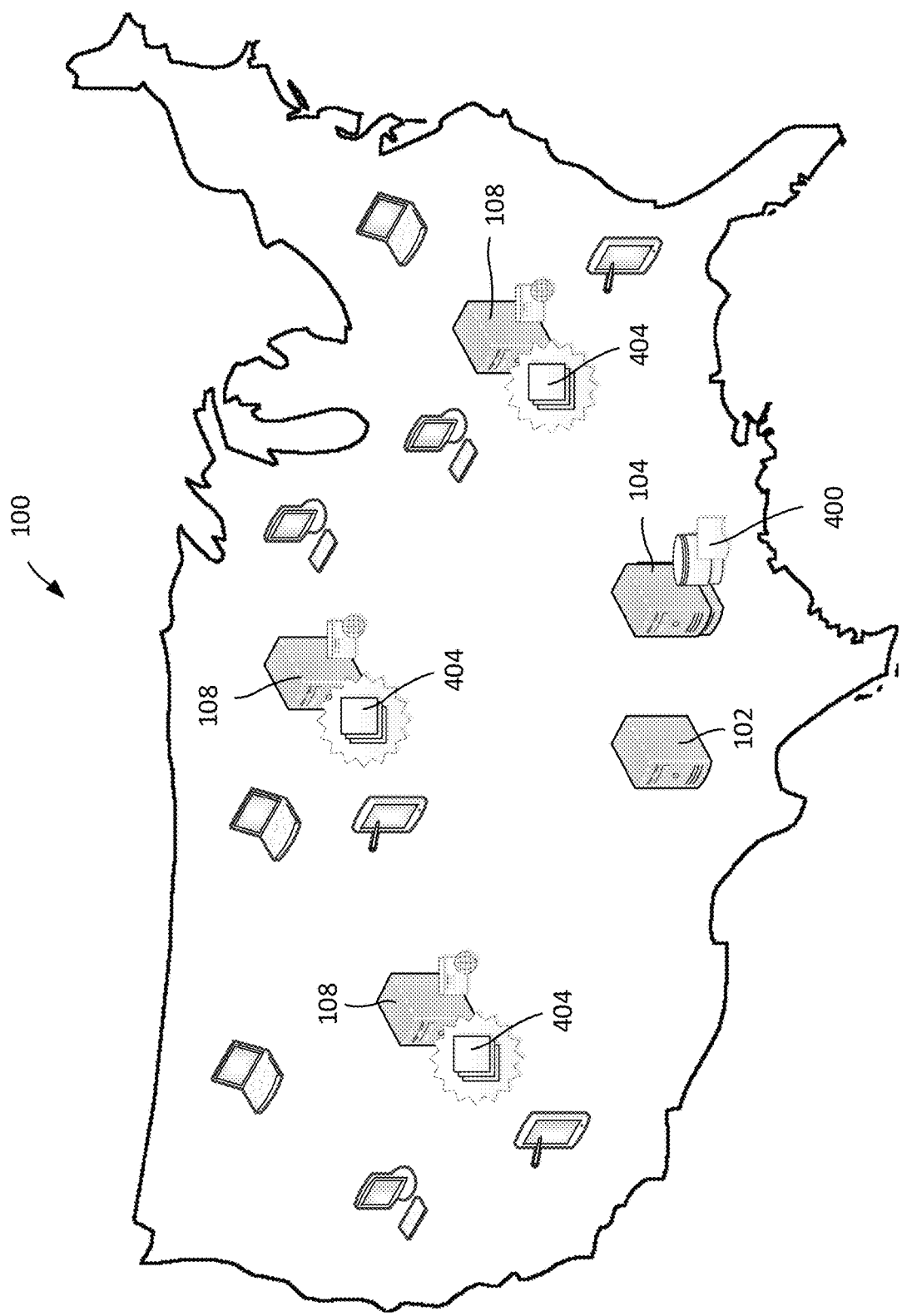

As described herein, the server computer system 102 (though the command module 150) can deploy a content distribution network, such that the responsibilities of fulfilling requests for the data 400 are distributed across multiple different systems (e.g., the server computer systems 108). As shown in FIG. 4A, to deploy the content distribution network, the server computer system 102 can transmit a command 402 to each of the server computer systems 108 to initiate a virtual machine instance thereon. The server computer systems 102 can also transmit data associated with initializing the virtual machine instances (e.g., initialization data, disk images, and so forth). As shown in FIG. 4B, in response to receiving the commands 402, each of the server computer systems 108 initiates a respective virtual machine instance 404. Each virtual machine instance 404 can retrieve and cache the data 400 from server computer system 104, and transmit the data 400 to one or more client computer systems 112 in response to a request for the data 400.

Figure 4C:
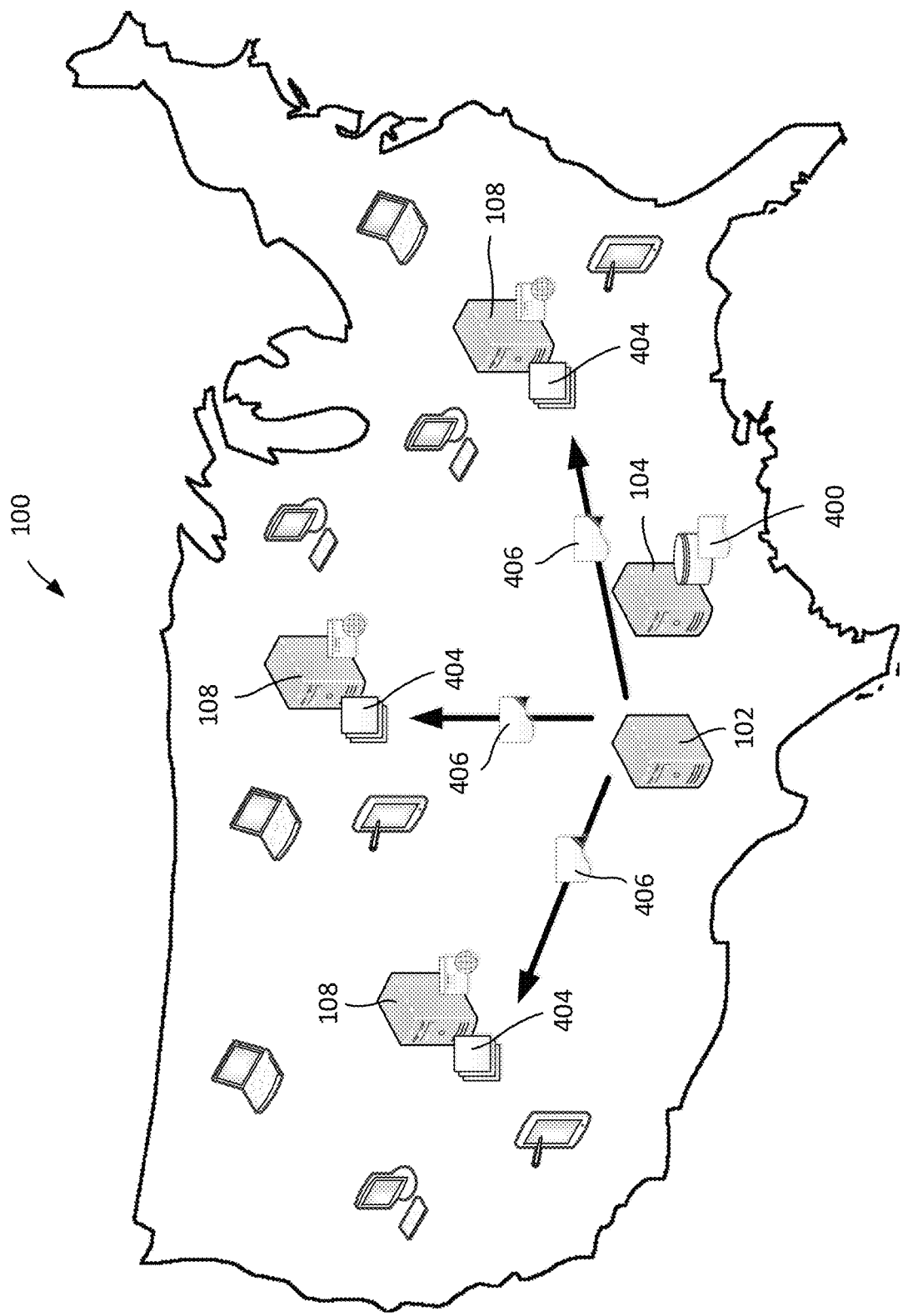

Further, as shown in FIG. 4C, the server computer system 102 can transmit configuration data 406. The configuration data 406 can include data specifying parameters for retrieving the data 400 from the server computer system 104, caching the data 400, and/or transmitting the data 400 to the client computer system 112 to fulfill requests. Each virtual machine instance 404 can operate in accordance with the received configuration data 406. In some cases, the server computer system 102 can transmit the configuration data 406 to a virtual machine instance 404 in response to a request by the virtual machine instance 404. In some cases, the server computer system 102 can transmit the configuration data 406 to a virtual machine instance 404 periodically, intermittently, or according to some other pattern of transmission.

Figure 4D:
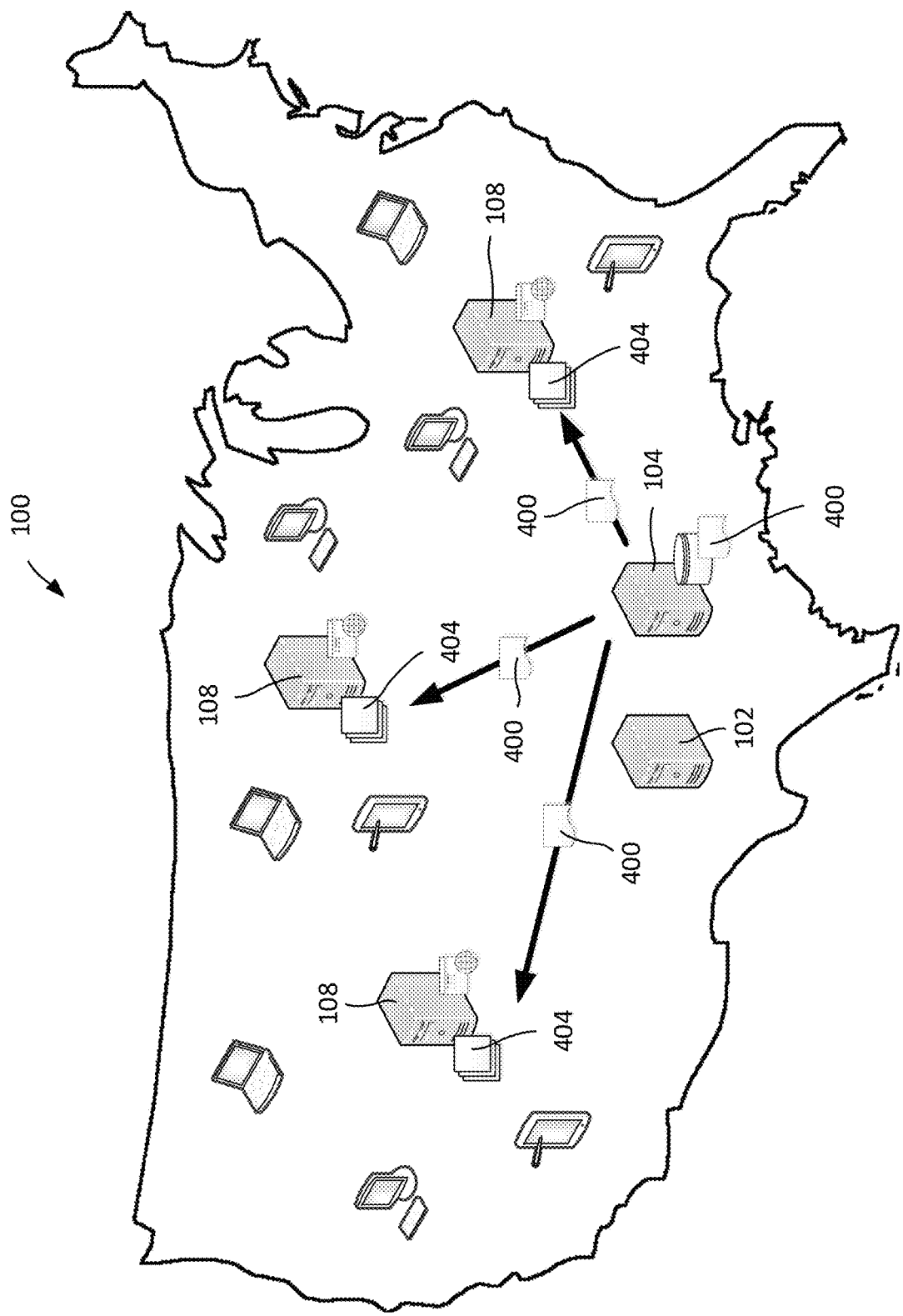

As shown in FIG. 4D, the virtual machine instances 404 can retrieve the data 400 from the server computer system 104 in accordance with the configuration data 406. Further, the virtual machine instances 404 can cache or store a copy of the data 400 locally (e.g., on a storage device of the server computer system 108), and make the data 400 available to the other devices of system 100 for retrieval.

Figure 4E:
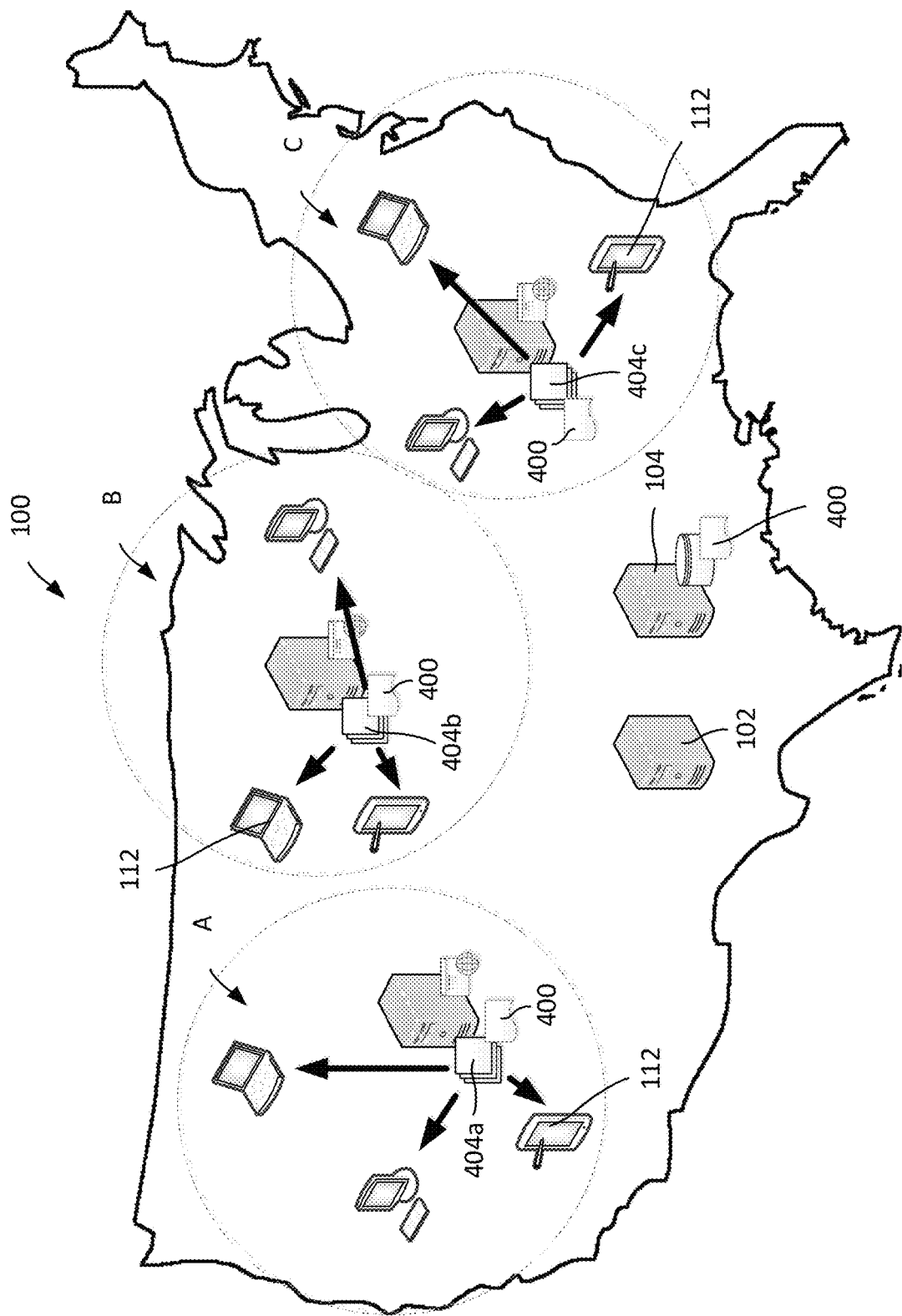

As shown in FIG. 4E, each of the client computer system 112 can transmit a request for the data 400 to one of the virtual machine instances 404, and in response, the virtual machine instance 404 can transmit the data 400 to the client computer system 112 to fulfill the request. Accordingly, the client computer systems 112 can obtain the data 400 from the virtual machine instances 404, rather than directly from the server computer system 104.

In some cases, the client computer system 112 can directly transmit a request for the data 400 to one of the virtual machine instances 404. For example, instead of transmitting a request for the data 400 to the server computer system 104, a client computer system 112 can instead transmit the request to one of the virtual machine instances 404.

In some cases, the client computer system 112 can initially transmit a request to an intermediary system, and the intermediary system can redirect the request to one of the virtual machine instances 404 for fulfillment. As an example, a client computer system 112 can transmit a request to the server computer 102. In response, the server computer 102 can select one of the virtual machine instances 404 (e.g., through the command module 150), and redirect the request to the selected virtual machine instance 404 for fulfillment. As another example, a client computer system 112 can transmit a request to the server computer 104. In response, instead of fulfilling the request, the server computer 104 can select one of the virtual machine instances 404 (e.g., based on rules provided by the command module 150), and redirect the request to the selected virtual machine instance 404 for fulfillment. As another example, a client computer system 112 can transmit a request to another computer system (e.g., a domain name server [DNS] computer system or a load balancing computer system). In response, that computer system can select one of the virtual machine instances 404 (e.g., based on rules provided by the command module 150), and redirect the request to the selected virtual machine instance 404 for fulfillment.

The responsibilities of fulfilling requests for the data 400 are distributed across the multiple virtual machine instances 404, such that no single virtual machine instance 404 or the server computer system 104 is solely responsible for fulfilling requests. For instance, as shown in FIG. 4E, the requests from client computing systems 112 in a group A are fulfilled by a first virtual machine instance 404a, the requests from client computing systems 112 in a group B are fulfilled by a second virtual machine instance 404b, and the requests from client computing systems 112 in a group C are fulfilled by a third virtual machine instance 404c.

As described herein, a particular virtual machine instance 404 can be selected for a particular request based on a control scheme generated by the command module 150. For example, the control module 150 can generate one or more rules specifying which virtual machine instance 404 should be selected in response to particular requests for data from a client computer device 112. These rules can depend on various factors.

As an example, one or more rules can specify that a particular virtual machine instance 404 be selected to fulfill a request based on a geographic proximity between the virtual machine instance and the client computer 112 making the request. For instance, the virtual machine instance 404 that is physically nearest the client computer 112 making the request can be selected to fulfil the request.

As another example, one or more rules can specify that a particular virtual machine instance 404 be selected to fulfill a request based on an operating cost associated with fulfilling the request using the virtual machine instance 404. For instance, the virtual machine instance 404 that can fulfill the request at the lowest monetary cost can be selected to fulfill the request.

As another example, one or more rules can specify that a particular virtual machine instance 404 be selected to fulfill a request based on an availability of resources (e.g., network resources, computational resources, etc.) to fulfill the using the virtual machine instance 404. For example, a virtual machine instance 404 having a network route with sufficient bandwidth to transmit the data 400 can be selected to fulfill the request. As another example, a virtual machine instance 404 having sufficient computational capacity (e.g., a sufficiently low CPU utilization or load) can be selected to fulfill the request. As another example, virtual machine instances can be selected to balance a resource load across multiple different virtual machine instances. For instance, a virtual machine instance 404 having relatively greater amount of available resources relative to one or more other virtual machine instances 404 can be selected to fulfill the request.

In some cases, the system that selects a particular virtual machine instance 404 to fulfill a request (e.g., an intermediary system) can make the selection based on telemetry data collected from each of the virtual machine instances. For example, the system can retrieve telemetry data such as an amount of resources being consumed by each virtual machine instance, the amount of resources available for use by a virtual machine instance, a "heath" of a virtual machine instance (e.g., whether the virtual machine instance is functionally normally or anomalously), or other information describing the ability for the virtual machine instances to fulfill requests. The system can make a selection based on this information. In some cases, the system can collect telemetry data periodically, intermittently, or according to some other pattern.

In some cases, multiple different rules can be used in conjunction. For examples, rules can specify that particular virtual machine instances be selected based on a combination of several different factors (e.g., geographic proximity, operating cost, network resource availability, computational resource availability, etc.)

Further, the rules can be transmitted to one of more of the other devices of the system 100 (e.g., the server computer system 104 and/or the client computer systems 112) and/or to another computer system (e.g., a DNS computer system or a load balancing computer system) to facilitate the selection process.

In some cases, a virtual machine instance 404 can "advertise" its availability to fulfill requests to an intermediary system (e.g., by transmitting a message to the intermediary system indicating that the virtual machine instance 404 is active, and has sufficient resources to fulfill requests). Based on this information, the intermediary system can identify which virtual machine instances 404 are available to fulfill requests at any particular moment, and select one of the virtual machine instances 404 to fulfill each specific request.

In some cases, a virtual machine instance 404 can "advertise" its availability, and also identify one or more network addresses (e.g., Internet Protocol [IP] addresses, Media Access Control [MAC] addresses, etc.) associated with the virtual machine instance 404. Based on this information, the intermediary system can identify which virtual machine instances 404 are available to fulfill requests at any particular moment, select one of the virtual machine instances 404 to fulfill each specific request, and specifically identify the network address that can be used to communicate with that virtual machine instance 404. In this manner, specific network addresses can be advertised as available to fulfill requests.

Further, the intermediary system can identify virtual machine instances 404 that can no longer fulfill requests, and select one or more other virtual machine instances 404 to fulfill requests. Further, the intermediary system can identify network addresses associated with the unavailable virtual machine instances, and omit them from consideration during the selection process. In some cases, an intermediary system can affirmatively indicate its unavailability to the intermediary system (e.g., by transmitting a message to the intermediary system indicating that the virtual machine instance 404 is inactive, does not have sufficient resources to fulfill requests, and/or is otherwise unable to fulfill requests). In some cases, an intermediary system can automatically determine that a virtual machine instance 404 is not available (e.g., if that virtual machine instance 404 has not "advertised" its availability for a particular amount of time).

As described herein, each of the virtual machine instances 404 operates in accordance with configuration data transmitted by the server computer system 102. Further, operation of the virtual machine instances 404 can be altered by modifying the configuration data at the server computer system 102, and distributing the modified configuration data to each of the virtual machine instances 404.

Figure 5A:
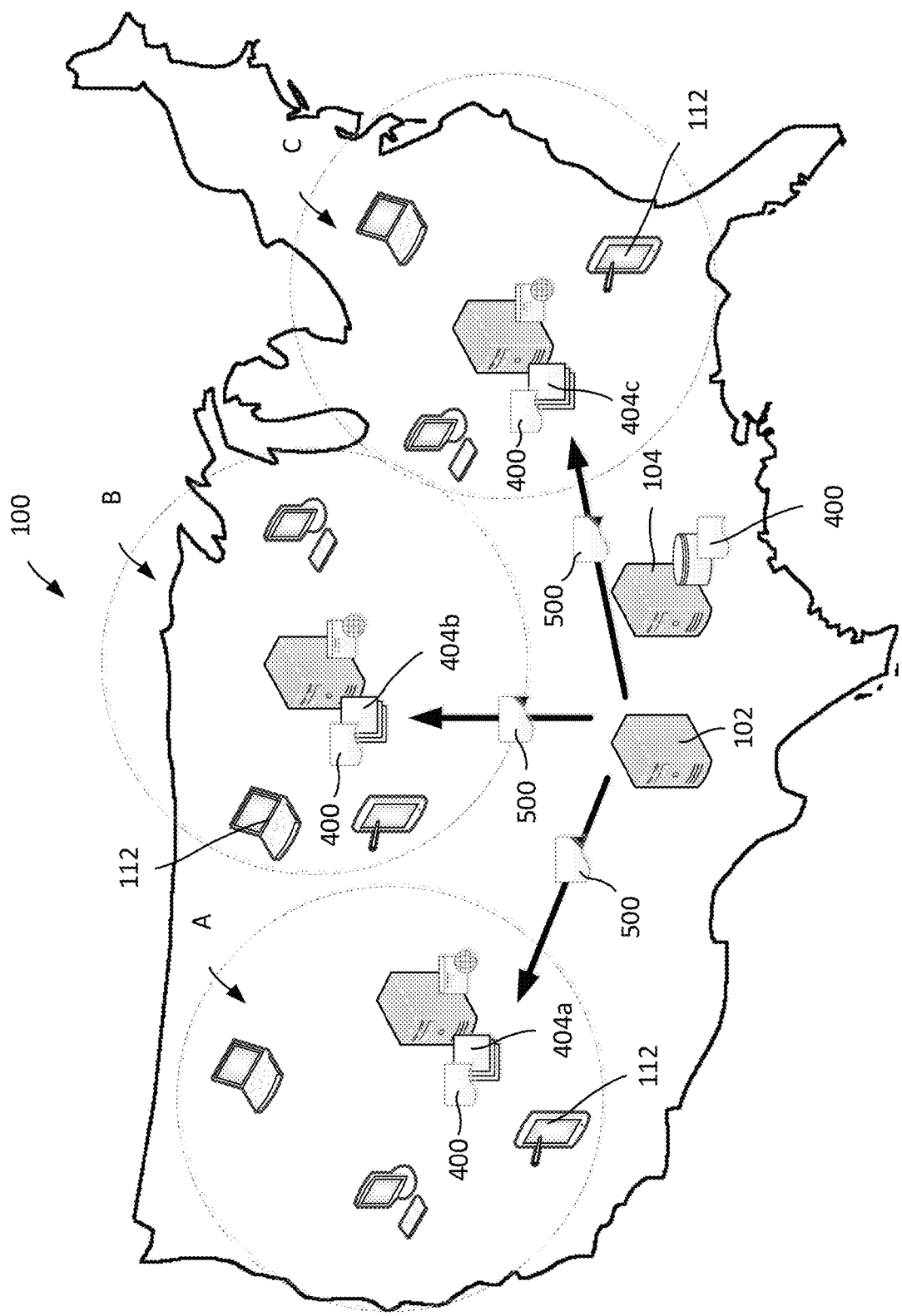
FIGS. 5A-5C are schematic diagrams depicting an example modification to an operation of a content delivery network using the system shown in FIG. 1.

For example, as shown in FIG. 5A, the server computer system 102 (through the command module 150) can generate new and/or revised configuration data 500, and transmit the configuration data 500 to each of the virtual machine instances 404a-c. For example, the new configuration data 500 can include data specifying modifications to the parameters for retrieving the data 400 from the server computer system 104, caching the data 400, and/or transmitting the data 400 to the client computer system 112 to fulfill requests. In this example, the configuration data 500 specifies that the virtual machine instances 404a and 404b are responsible to fulfilling requests for different groups of client computer systems 112 than before, and that the virtual machine instance 404c is no longer responsible for fulfilling any requests.

Figure 5B:
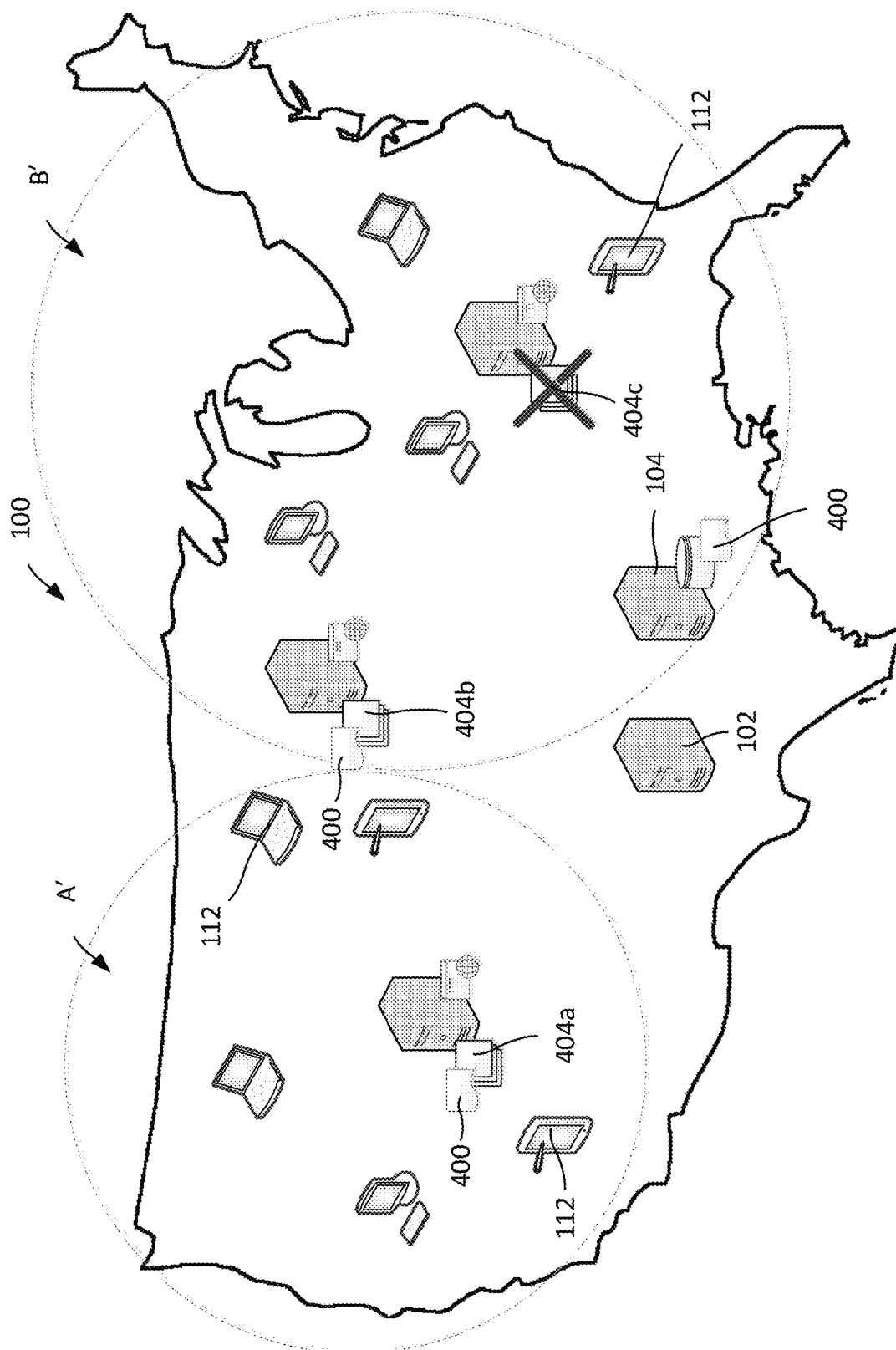
Figure 5C:
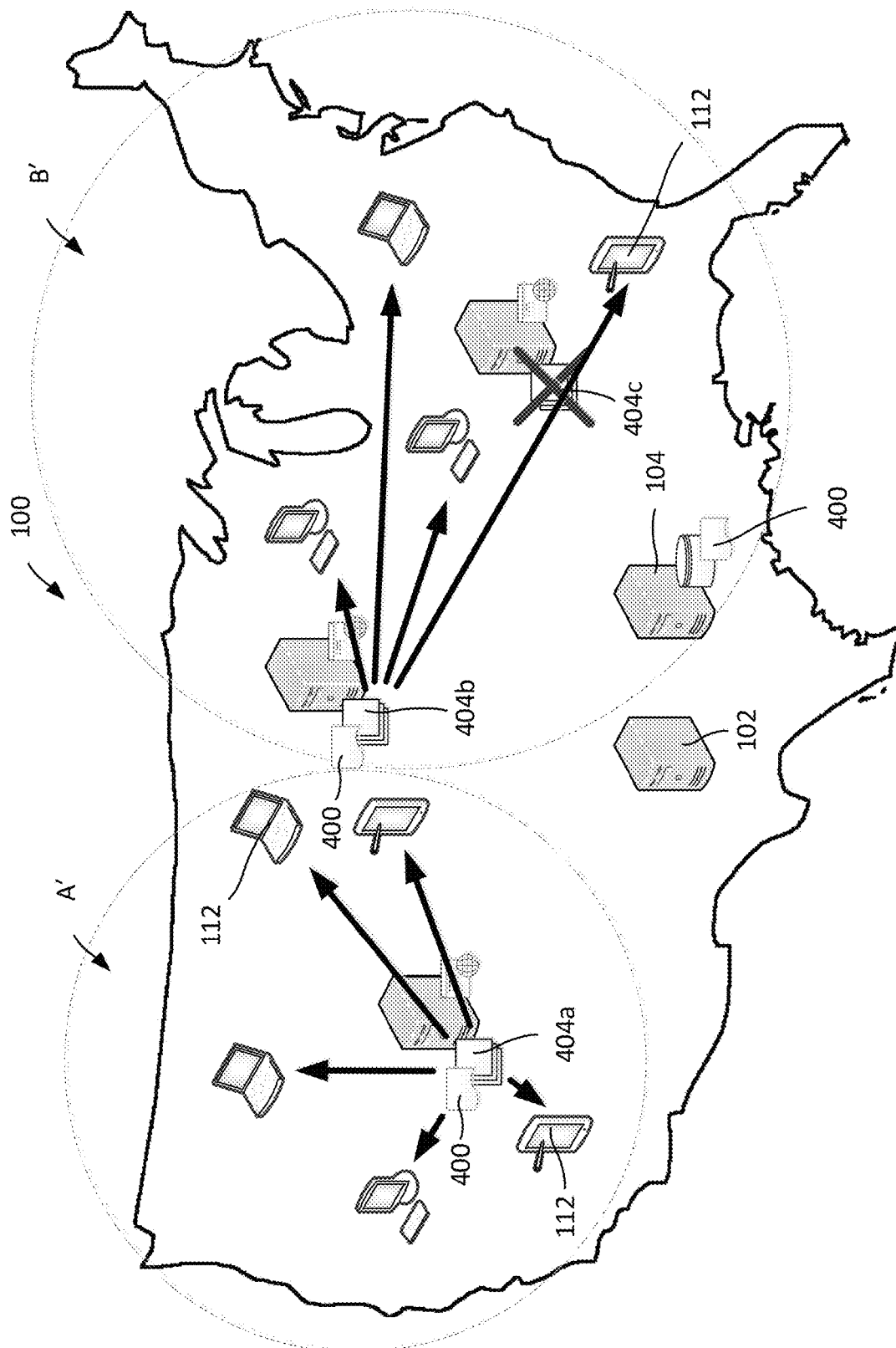

Each virtual machine instance 404a-c can operate in accordance with the configuration data 500. For example, as shown in FIG. 5B, in accordance with the configuration data 500, the first virtual machine instance 404a can assume responsibility for fulfilling requests from client computing systems 112 in a revised group A', and the second virtual machine instance 404b can assume responsibility for fulfilling requests from client computing systems 112 in a revised group B'. Further, the third virtual machine instance 404c can discontinue responsibility for fulfilling requests. As shown in FIG. 5C, the virtual machine instances 404a-c can transmit data (or not transmit data) to the client computer systems 112 in accordance with the configuration data 500. In this manner, the server computer system 102 (through the control module 150) can dynamically control the operation of each of the virtual machine instances 404a-c.

As shown in FIGS. 4A and 4B, the server computer system 102 (through the command module 150) can initiate virtual machines instances on the server computer systems 108 (e.g., to add additional computing resources to the content distribution network). In some cases, additional virtual machines instances can be initiated dynamically in response to demand. For example, in response to an increased demand for the data 400 from a particular geographical region, additional virtual machine instances can be initiated to serve that geographical region, such that additional resources are available to satisfy the demand. As another example, in response to a decreased demand for data from a content server from a particular geographical region, one or more virtual machine instances serving that geographical region can be terminated, such that fewer computation resources are consumed. Similarly, virtual machine instances can be initiated in response to other factors (e.g., in response to new or revised rules generated by the control module 150, changes to the availability of the server computer systems 106, the availability of additional server computer systems for initiating virtual machine instances, a change is operating costs associated with server computer systems and/or virtual machine instances, etc.)

The server computer system (through the command module 150) can also dynamically terminate virtual machines instances on the server computer systems 108 (e.g., to reduce the computing resources consumed by the content distribution network). Terminating a virtual machine instance can include, for example, suspending, closing, discontinuing, or shutting down operation of the virtual machine on a server computer system.

Figure 6A:
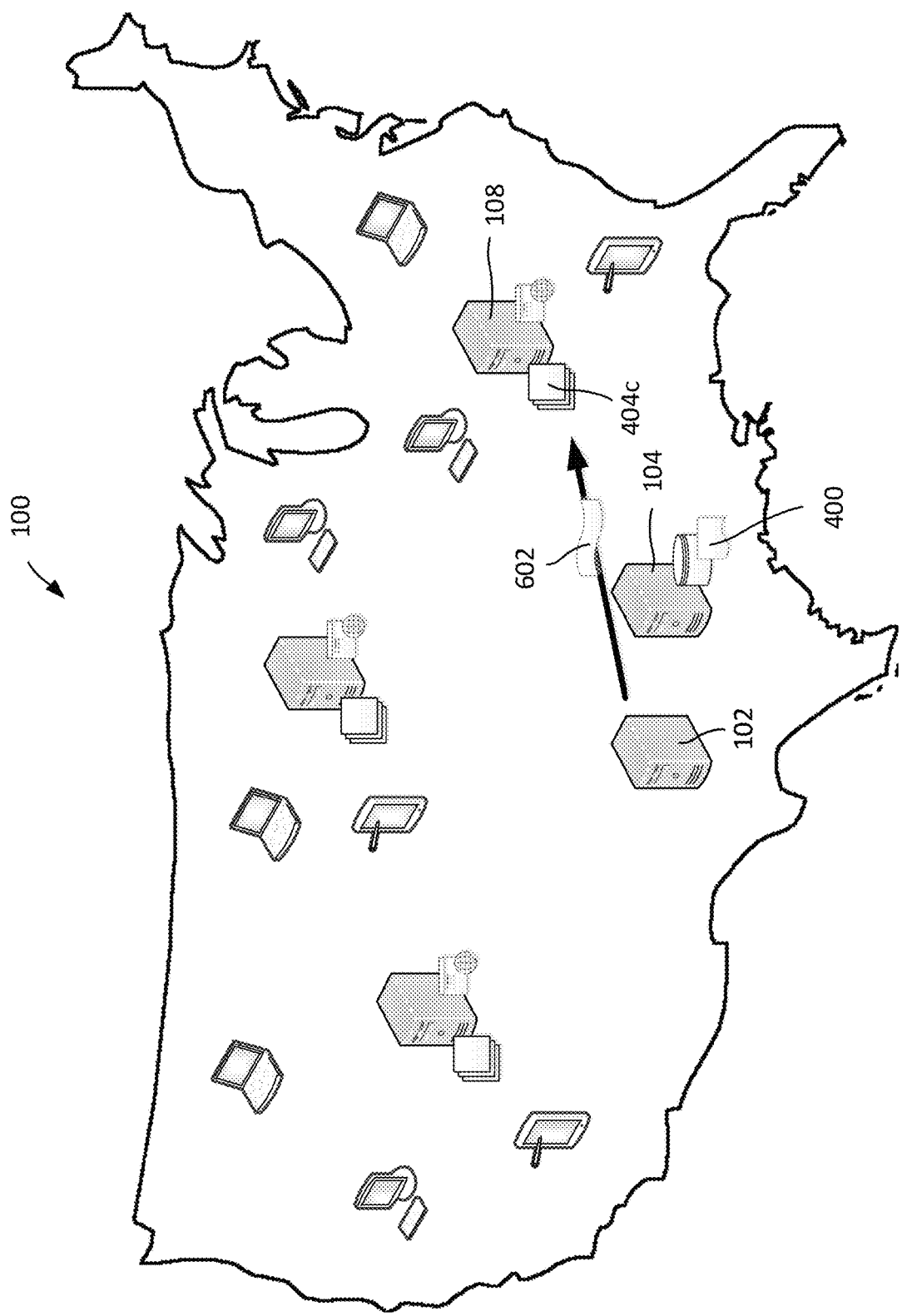
FIGS. 6A and 6B are schematic diagrams depicting an example termination of virtual machine instances of the content delivery network using the system shown in FIG. 1.
Figure 6B:
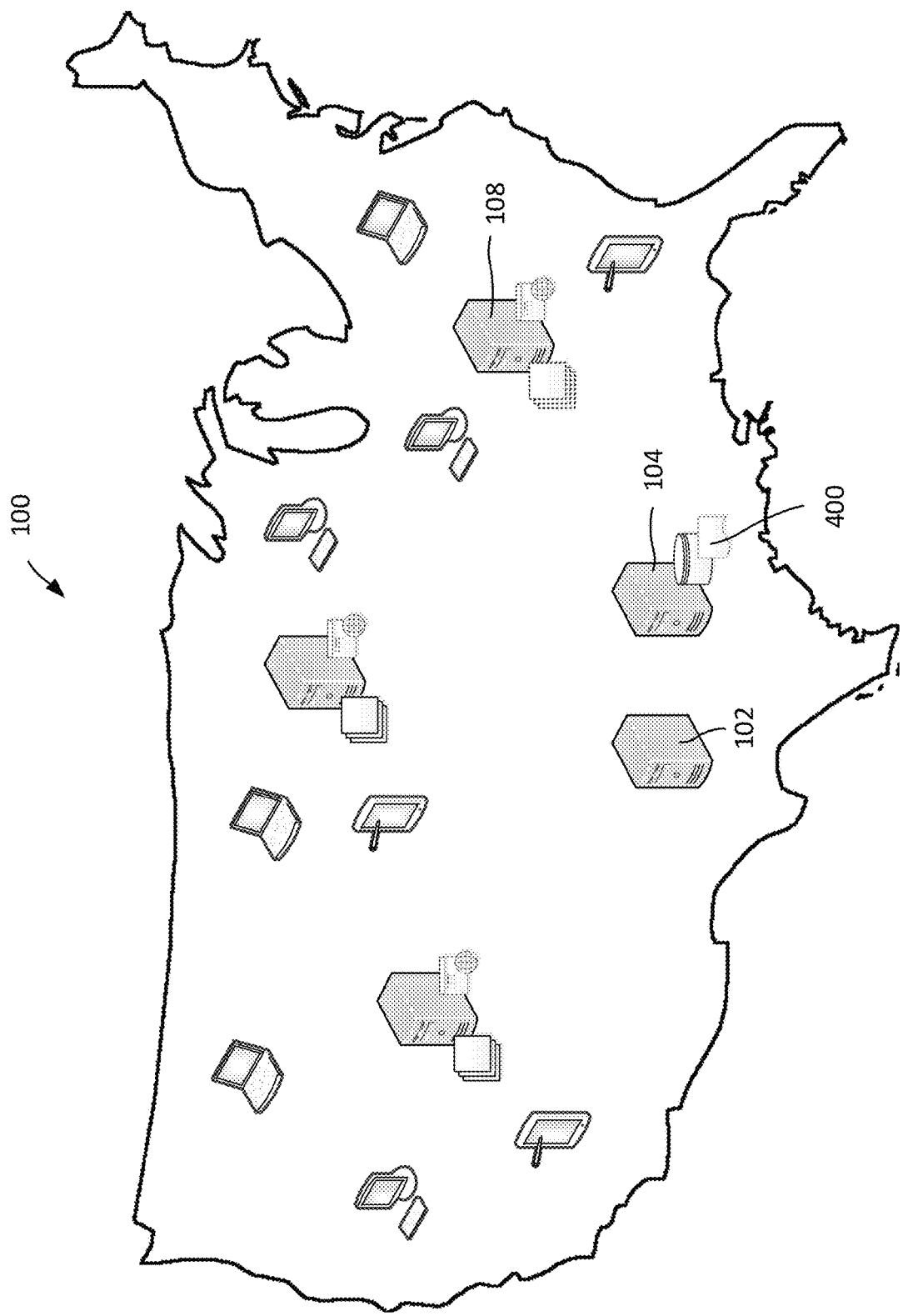

For example, as shown in FIG. 6A, to terminate the virtual machine instance 404c and remove it from the connect distribution network, the server computer system 102 can transmit a command 602 to the server computer system 108 providing the machine virtual machine instance 404c to terminate the virtual machine instance 404c. As shown in FIG. 6B, in response to receiving the command 602, the server computer system 108 terminates the virtual machine instance 404c, thereby removing it from the content distribution network. In some cases, a virtual machine instance can be selectively initiated and terminated multiple different times (e.g., in response to changing demand for the data 400).

Although FIGS. 1-6 show systems having particular numbers of server computer systems and client computer systems, it is understood that these are merely illustrative examples. In practice, a system can include any number of server computer systems and/or client computer systems.

Figure 7:
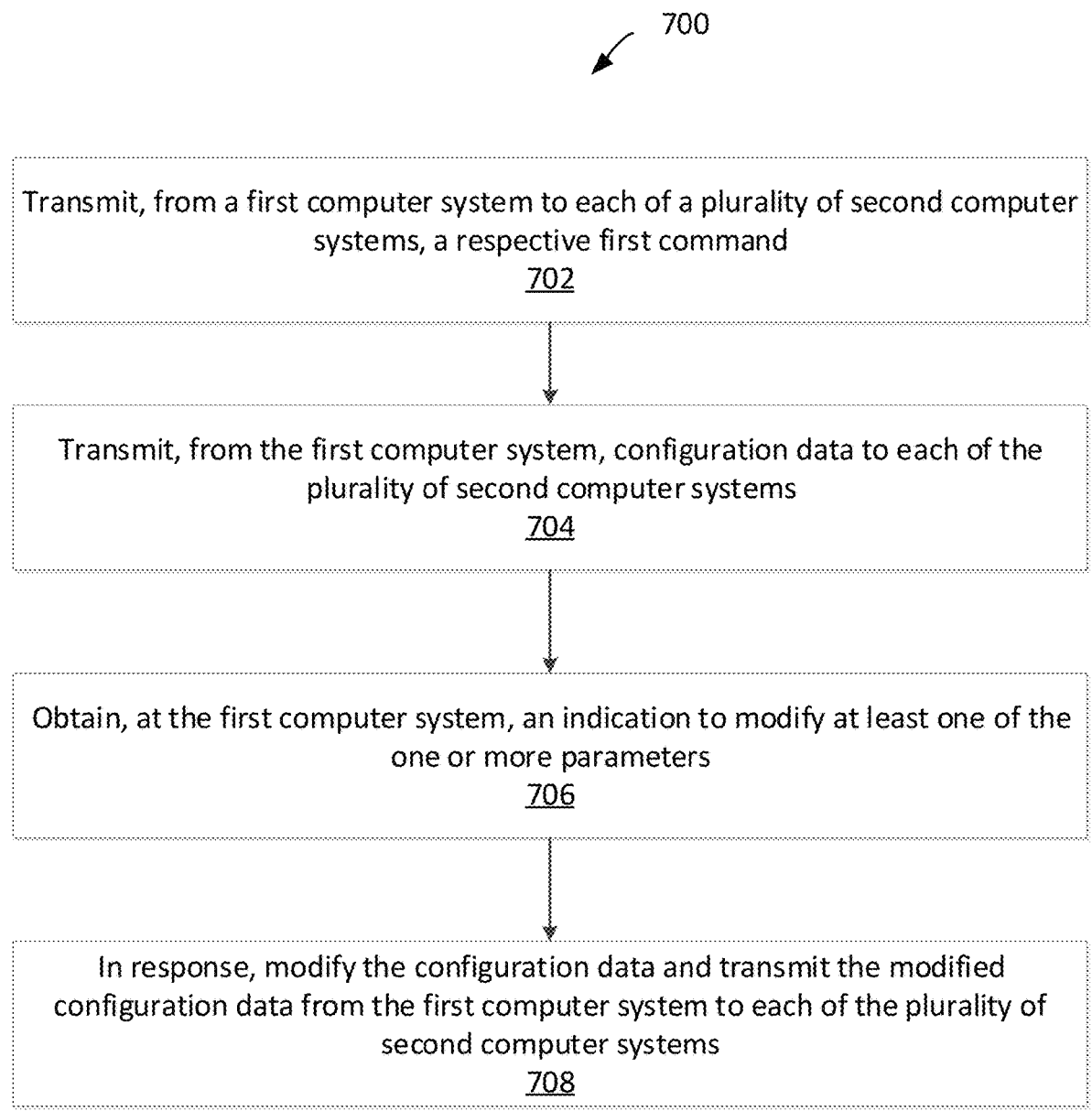
FIG. 7 is a flow chart diagram of an example process for fulfilling requests for data.

An example process 700 for fulfilling requests for data is shown in FIG. 7.

In the process 700, a first computer system transmits, to each of a plurality of second computer systems, a respective first command (step 702). Each first command includes instructions to initiate one or more virtual machine instances on the respective second computer system. Each virtual machine instance is configured to retrieve data from a third computer system over a communications network, cache the retrieved data, and transmit the cached data to one or more client computers over the communications network in response to a request for the cached data by the one or more client computers. Example first commands are described, for instance, with respect to FIG. 4A.

In some implementations, at least one of the second computer systems can be maintained by a first organization. Further, at least one of the second computer system can be maintained by a second organization different than the first organization. In some implementations, the first organization can be a first cloud computing service provider, and the second organization can be a second cloud computing server provider different than the second cloud computing service provider.

The first computer system transmits configuration data to each of the plurality of second computer systems (step 704). The configuration data includes indications of one or more parameters associated with retrieving the data from the third computer system, caching the retrieved data, and/or transmitting the cached data to the one or more client computers. Example configuration data is described, for instance, with respect to FIG. 4C.

In some implementations, the one or more parameters can include an indication of a geographical region associated with retrieving the data from the third computer system, caching the retrieved data, and/or transmitting the cached data to the one or more client computers. In some implementations, the one or more parameters can include an indication of available network routes on the communications network associated with retrieving the data from the third computer system and/or transmitting the cached data to the one or more client computers. In some implementations, the one or more parameters can include an indication of a load balancing between two or more virtual machine instances with respect to retrieving the data from the third computer system, caching the retrieved data, and/or transmitting the cached data to the one or more client computers. Other example parameters are described herein, for instance, with respect to the command module 150 shown in FIGS. 1 and 3.

In some implementations, the configuration data can be transmitted from the first computer system to a particular second computer system in response to a request for the configuration data from that second computer system. In some implementations, the request for the configuration data is transmitted periodically to the first computer system from the second computer system.

The first computer system obtains an indication to modify at least one of the one or more parameters (step 706). In response, the first computer system modifies the configuration data and transmits the modified configuration data from the first computer system to each of the plurality of second computer systems (step 708). Examples of obtaining indications to modify one or more parameters, and in response, modifying the configuration data and transmitting the data to the second computer systems are described, for instance, with respect to FIGS. 5A and 5B.

In some implementations, the one or more parameters comprise an indication of a geographical region associated with retrieving the data from the third computer system, caching the retrieved data, and/or transmitting the cached data to the one or more client computers. In some implementations, the one or more parameters comprise an indication of available network routes on the communications network associated with retrieving the data from the third computer system and/or transmitting the cached data to the one or more client computers. In some implementations, the one or more parameters comprise an indication of a load balancing between two or more virtual machine instances with respect to retrieving the data from the third computer system, caching the retrieved data, and/or transmitting the cached data to the one or more client computers.

In some implementations, the first computer system can receive resource data describing an availability of computational resources available to each of the second computer systems, and generate the indication to modify at least one of the one or more parameters based on the resource data. Example resource data is described herein, for instance, with respect to the command module 150 shown in FIGS. 1 and 3.

In some implementations, the first computer system can receive logistical data describing an operating cost associated with each of the second computer systems, and generate the indication to modify at least one of the one or more parameters based on the logistical data. Example logistical data is described herein, for instance, with respect to the command module 150 shown in FIGS. 1 and 3.

In some implementations, the first computer system can transmit, to at least one of the second computer systems, a respective second command. Each second command can include instructions to terminate a virtual machine instance on the respective second computer systems. Examples of this command and subsequent termination are described, for instance, with respect to FIGS. 6A and 6B.

In some implementations, at least one of the second computer systems can be maintained by a first organization. Further, at least one of the second computer system can be maintained by a second organization different than the first organization.

The implementations described herein can provide various technical benefits. In some cases, the implementations described herein can enable a content distribution network to be deployed, maintained, and operated in a more efficient manner. For example, as virtual machine instances can be dynamically initiated and terminated (e.g., in response to demand), computation resources are used more efficiently. Further, in some cases, the implementations described herein can enable data to be transmitted more quickly and/or efficiently over a communications network. For example, as multiple virtual machine instances are used to dynamically retrieve data, cache data, and transmit data to others (e.g., to fulfill requests for the data) in a distributive manner, any single system is less likely to be overburdened by requests. Further, data can be cached at multiple different geographical locations, instead of at a single location. Accordingly, the data can be transmitted over shorter distances in response to requests. Further still, as the system caches data at multiple different graphical locations and using multiple different systems, the system provides a degree of redundancy, and is less susceptible to failure.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the server systems 102, 104, and 106, the modules 150 and 152, and the client devices 112 can be implemented using digital electronic circuitry, or in computer software, firmware, or hardware, or in combinations of one or more of them. In another example, the process shown in FIGS. 4-7 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 8:
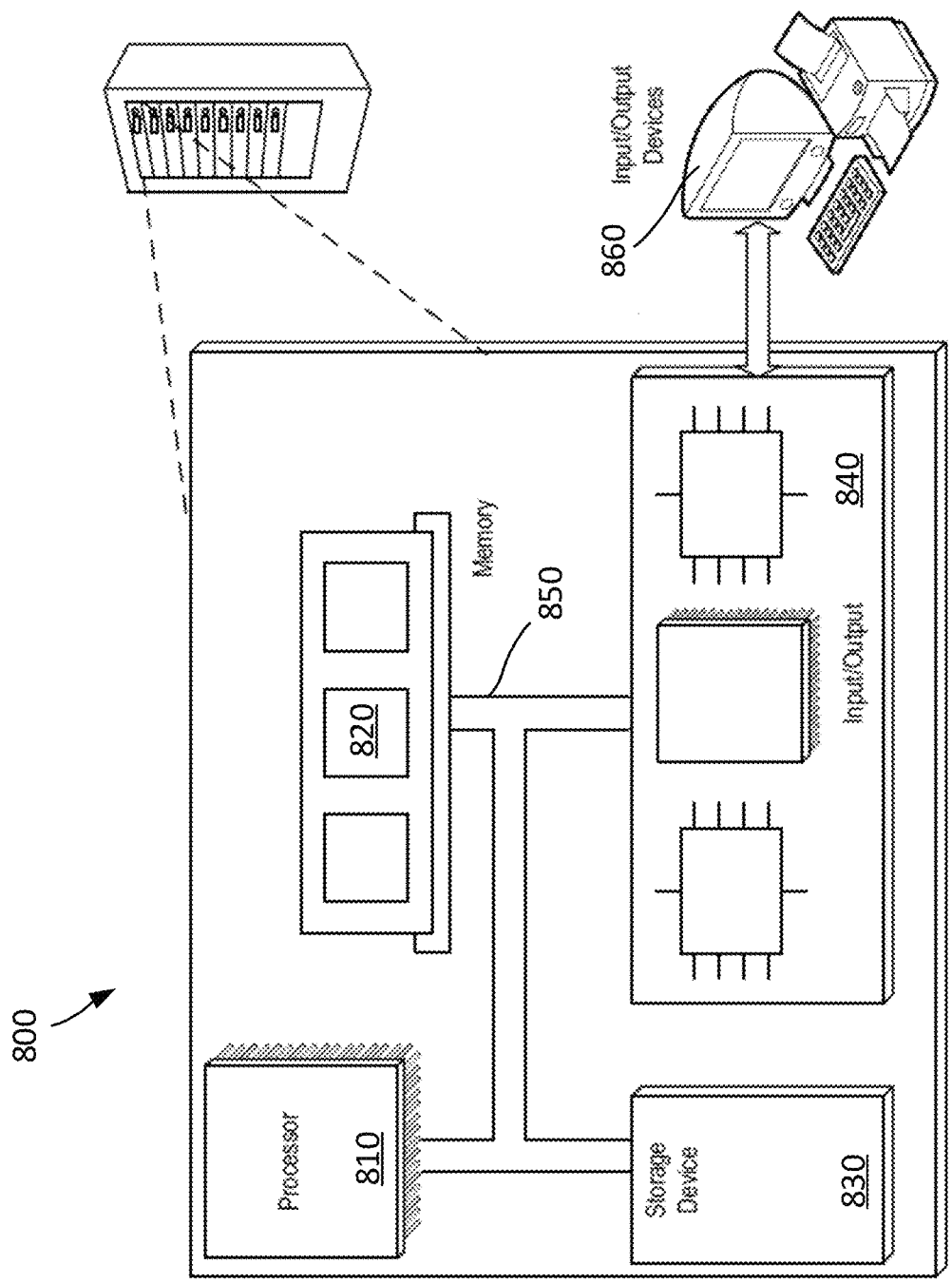
FIG. 8 is a schematic diagram of an example computer system.

FIG. 8 shows an example computer system 800 that includes a processor 810, a memory 820, a storage device 830 and an input/output device 840. Each of the components 810, 820, 830 and 840 can be interconnected, for example, by a system bus 850. The processor 810 is capable of processing instructions for execution within the system 800. In some implementations, the processor 810 is a single-threaded processor, a multi-threaded processor, or another type of processor. The processor 810 is capable of processing instructions stored in the memory 820 or on the storage device 830. The memory 820 and the storage device 830 can store information within the system 800.

The input/output device 840 provides input/output operations for the system 800. In some implementations, the input/output device 840 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 860. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the invention. Accordingly, other embodiments are within the scope of the following claims.

What is claimed is:

1. A method comprising:
   transmitting, from a first computer system to each of a plurality of second computer systems, a respective first command, wherein each first command comprises instructions to initiate one or more virtual machine instances on the respective second computer system to deploy a content distribution network (CDN);
   transmitting, from the first computer system to each of the plurality of second computer systems, configuration data, wherein the configuration data comprises indications of one or more parameters associated with an operation of the CDN, the one or more parameters comprising an indication of a load balancing between two or more virtual machine instances;
   receiving, at the first computer system, logistical data describing an operating cost associated with each of the second computer systems and resource data describing an availability of computational resources available to each of the second computer systems;
   determining, at the first computer system based on the logistical data and the resource data, one or more modifications to at least one of the one or more parameters of the configuration data; and
   transmitting, from the first computer system to at least one of the second computers, a respective second command, wherein each second command comprises instructions to operate the one or more virtual machine instances on the respective second computer system in accordance with the one or more modifications.

2. The method of claim 1, wherein the one or more parameters comprise an indication of a geographical region associated with the operation of the CDN.

3. The method of claim 1, wherein the one or more parameters comprise an indication of available network routes on the communications network associated with the operation of the CDN.

4. The method of claim 1, further comprising transmitting, from the first computer system to at least one of the second computer systems, a third second command, wherein each third command comprises instructions to terminate a virtual machine instance on the respective second computer systems.

5. The method of claim 1, wherein the configuration data is transmitted from the first computer system to a particular second computer system in response to a request for the configuration data from that second computer system.

6. The method of claim 5, wherein the request for the configuration data is transmitted periodically to the first computer system from the second computer system.

7. The method of claim 1, wherein at least one of the second computer systems is maintained by a first organization, and
wherein at least one of the second computer system is maintained by a second organization different than the first organization.

8. The method of claim 7, wherein the first organization is a first cloud computing service provider, and
wherein the second organization is a second cloud computing server provider different than the second cloud computing service provider.

9. A system comprising:
one or more processors; and
one or more non-transitory computer-readable media including one or more sequences of instructions which, when executed by the one or more processors, causes the one or more processors to perform operations comprising:
transmitting, from a first computer system to each of a plurality of second computer systems, a respective first command, wherein each first command comprises instructions to initiate one or more virtual machine instances on the respective second computer system to deploy a content distribution network (CDN);
transmitting, from the first computer system to each of the plurality of second computer systems, configuration data, wherein the configuration data comprises indications of one or more parameters associated with an operation of the CDN, the one or more parameters comprising an indication of a load balancing between two or more virtual machine instances;
receiving, at the first computer system, logistical data describing an operating cost associated with each of the second computer systems and resource data describing an availability of computational resources available to each of the second computer systems;
determining, at the first computer system based on the logistical data and the resource data, one or more modifications to at least one of the one or more parameters of the configuration data; and
transmitting, from the first computer system to at least one of the second computers, a respective second command, wherein each second command comprises instructions to operate the one or more virtual machine instances on the respective second computer system in accordance with the one or more modifications.

10. The system of claim 9, wherein the one or more parameters comprise an indication of a geographical region associated with the operation of the CDN.

11. The system of claim 9, wherein the one or more parameters comprise an indication of available network routes on the communications network associated with the operation of the CDN.

12. The system of claim 9, the operations further comprising transmitting, from the first computer system to at least one of the second computer systems, a third second command, wherein each third command comprises instructions to terminate a virtual machine instance on the respective second computer systems.

13. The system of claim 9, wherein the configuration data is transmitted from the first computer system to a particular second computer system in response to a request for the configuration data from that second computer system.

14. The system of claim 13, wherein the request for the configuration data is transmitted periodically to the first computer system from the second computer system.

15. The system of claim 9, wherein at least one of the second computer systems is maintained by a first organization, and
wherein at least one of the second computer system is maintained by a second organization different than the first organization.

16. The system of claim 15, wherein the first organization is a first cloud computing service provider, and
wherein the second organization is a second cloud computing server provider different than the second cloud computing service provider.

17. One or more non-transitory computer-readable media including one or more sequences of instructions which, when executed by one or more processors, causes the one or more processors to perform operations comprising:
transmitting, from a first computer system to each of a plurality of second computer systems, a respective first command, wherein each first command comprises instructions to initiate one or more virtual machine instances on the respective second computer system to deploy a content distribution network (CDN);
transmitting, from the first computer system to each of the plurality of second computer systems, configuration data, wherein the configuration data comprises indications of one or more parameters associated with an operation of the CDN, the one or more parameters comprising an indication of a load balancing between two or more virtual machine instances;
receiving, at the first computer system, logistical data describing an operating cost associated with each of the second computer systems and resource data describing an availability of computational resources available to each of the second computer systems;
determining, at the first computer system based on the logistical data and the resource data, one or more modifications to at least one of the one or more parameters of the configuration data; and
transmitting, from the first computer system to at least one of the second computers, a respective second command, wherein each second command comprises instructions to operate the one or more virtual machine instances on the respective second computer system in accordance with the one or more modifications.

18. The one or more non-transitory computer-readable media of claim 17, wherein the one or more parameters comprise an indication of a geographical region associated with the operation of the CDN.

19. The one or more non-transitory computer-readable media of claim 17, wherein the one or more parameters comprise an indication of available network routes on the communications network associated with the operation of the CDN.

20. The one or more non-transitory computer-readable media of claim 17, the operations further comprising transmitting, from the first computer system to at least one of the second computer systems, a third second command, wherein each third command comprises instructions to terminate a virtual machine instance on the respective second computer systems.

\* \* \* \* \*